May 20, 1969  J. R. HUMPHRIES, JR  3,445,334
CONTROL ROD AND DRIVE MECHANISM THEREFOR
Filed Jan. 24, 1966  Sheet 1 of 2

INVENTOR.
JOHN R. HUMPHRIES JR.
BY Anderson, Luedeka, Fitch, Even, & Tabin ATTORNEYS

INVENTOR.
JOHN R. HUMPHRIES JR.

United States Patent Office 3,445,334
Patented May 20, 1969

3,445,334
CONTROL ROD AND DRIVE MECHANISM THEREFOR
John R. Humphries, Jr., San Diego, Calif., assignor, by mesne assignments, to Gulf General Atomic Incorporated, San Diego, Calif., a corporation of Delaware
Filed Jan. 24, 1966, Ser. No. 522,609
Int. Cl. G21c 7/16
U.S. Cl. 176—36                      3 Claims

ABSTRACT OF THE DISCLOSURE

A high speed control rod and its associated drive mechanism are described in connection with a nuclear reactor having a large prompt negative temperature coefficient. The control rod may be drawn upwardly from the core to cause a power pulse. The control rod is longer than the core and extends a substantial distance below the core. When it is withdrawn, this extra length enables the control rod to be accelerated to a substantial velocity before any effective change in reactivity of the core occurs. A piston located on the linkage mechanism close to the control rod coacts with a dash pot cylinder to brake the mechanism after the control rod is withdrawn and, because of its position, places a tensile stress on most of the linkage during braking.

---

This invention relates to a control rod mechanism for nuclear reactors which have a prompt negative temperature coefficient and, more particularly, to a high speed control rod and associated drive mechanism for rapidly moving the control rod in such a reactor from the core to cause the reactor to pulse.

A nuclear reactor generally includes a core assembly containing fuel (fissionable material), a moderating material, a reflector to conserve escaping neutrons, control and measuring elements, provision for heat removal, and suitable shielding. A nuclear reactor core is supplied with more than the critical amount of fissionable fuel so that the effective multiplication factor (i.e., the ratio of the number of neutrons produced by fission in each generation to the number of neutrons present in the preceding generation) can be made greater than unity. Normally, the multiplication factor is controlled by the introduction into the core of one or more control rods which absorb neutrons in the core.

The power output of a reactor is proportional to the density of neutrons in the reactor core. An increase in power output can be produced by partially or completely withdrawing one or more control rods to make the multiplication factor greater than one. A decrease in the power output can be produced by partially or completely inserting one or more control rods into the reactor core to make the multiplication factor less than one. In either case, when the power reaches a desired level, the control rod or rods are moved sufficiently to restore the multiplication factor to one again.

Normally, in a reactor, a sudden increase in reactivity (i.e., the departure of a reactor from critical), unless reduced very quickly, may increase the power of the reactor to a dangerous level. However, certain reactors such as the "Triga" reactors, which are manufactured and sold by the assignee of this invention, are inherently safe, because they exhibit a large prompt negative temperature coefficient (i.e., the reactivity decreases as the temperature of the fuel increases). One form of the "Triga" reactor is described in U.S. Patent No. 3,127,325, issued Mar. 31, 1964.

Reactors with sufficiently large (prompt) negative temperature coefficients, such as the "Triga" reactors, may be designed so as to be capable of pulsing, that is, the power is momentarily raised to a very high level without causing damage to the reactor. This is normally done by withdrawing very quickly a control rod from the core, for example, in 50 milliseconds. The rapid increase in reactivity as the result of such removal raises the power level of the reactor quickly. Once the temperature of the fuel has increased as a result of operation at the higher power level, the negative temperature coefficient characteristic of the reactor causes the power level to drop back off and hence define a pulse. In the U.S. Patent to Clifford et al, No. 3,156,624, a pulsing type "Triga" reactor is shown and described wherein three control rods are provided for regulation of reactor operation to various power levels, and wherein a fourth control rod is utilized for pulsing the reactor.

In designing a drive mechanism for rapidly moving a control rod in such a manner as to cause the reactor to pulse, a number of factors must be taken into consideration. The control rod is generally a relatively heavy item and, when combined with linkages for moving the control rod, a considerable mass must be moved in the operation of the mechanism. In order to obtain the desired fast pulse, it is necessary that the control rod be accelerated by its drive mechanism very quickly, requiring a relatively high accelerating force. Once the control rod is accelerated, a great deal of kinetic energy is present in the system and, after the control rod is removed from the reactor core, this considerable amount of energy must be absorbed in stopping the mechanism. Since space limitations may dictate that the mechanism be started and stopped quickly, relatively powerful actuating devices have heretofore been found necessary in order to produce fast acceleration of the control rod and drive mechanism. For the same reason, relatively strong and heavy linkages have been required to withstand the stresses and shock of the fast acceleration and deceleration of the control rod and drive mechanism.

It is an object of this invention to provide an improved drive mechanism for rapidly moving a control rod, in a nuclear reactor having a prompt negative temperature coefficient, from a first position to a second position to cause the reactor to pulse.

Another object of the invention is to provide such a drive mechanism wherein the kinetic energy which must be absorbed at the end of travel of the control rod is minimized.

Still another object of the invention is to obtain, in such a mechanism, a rapid effective movement of the control rod by utilizing relatively simple and low cost mechanical linkages and actuators.

A further object of the invention is to provide such a drive mechanism utilizing relatively lightweight linkages and a relatively small pneumatic cylinder for actuating the mechanism.

Other objects and the various advantages of the invention will become apparent to those skilled in the art from the following description taken in connection with the accompanying drawings, wherein.

Figure 1:
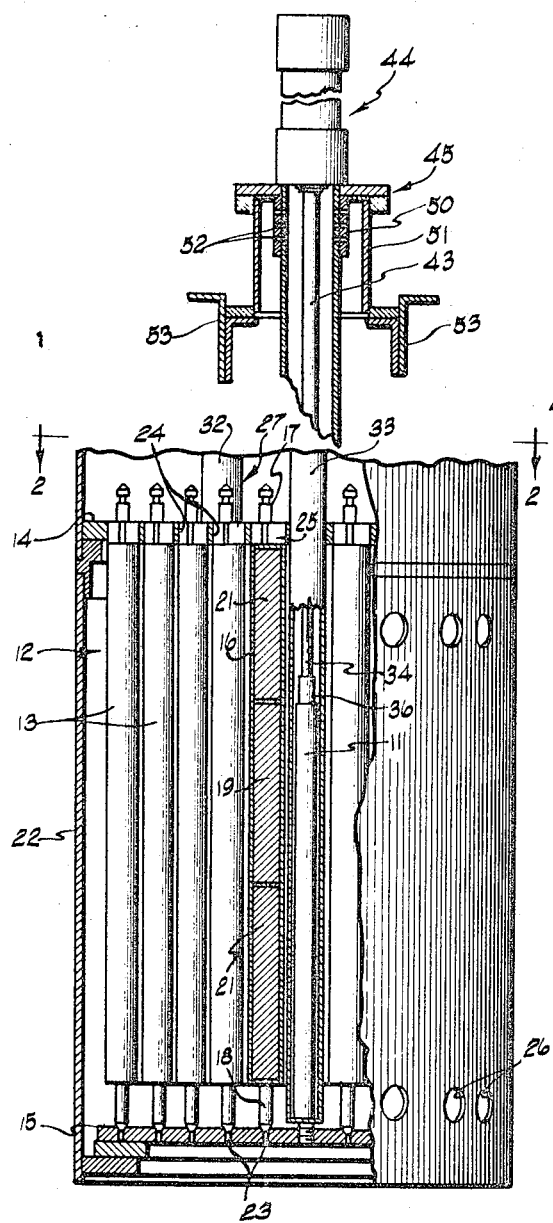
FIGURE 1 is an elevational view, with parts in section and parts broken away, of the reactive core portion of a nuclear reactor together with an associated control rod drive mechanism constructed in accordance with the invention.
Figure 2:
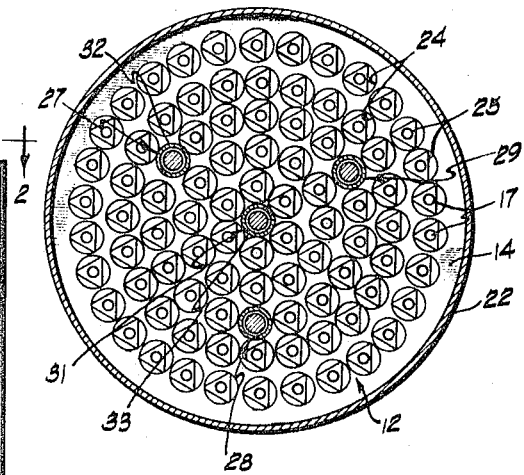
FIGURE 2 is a sectional view taken along the line 2—2 of FIGURE 1.

In accordance with the invention, a drive mechanism is provided for rapidly moving a control rod, in a nuclear reactor having a prompt negative temperature coefficent, from a first position within the active region of the reactor core to a second position outside such active region to cause the reactor to pulse. The drive mechanism includes an actuating device, such as a pneumatic cylinder, and a connecting rod which connects the control rod to the actuating device. An energy absorbing device, such as a dash pot, acts upon the connecting rod near the control rod end thereof to absorb the energy in the mechanism as the control rod reaches the second position. By locating the energy absorbing device relatively close to the core, one can use relatively lightweight linkages and, therefore, a relatively small pneumatic cylinder as the actuating device, thus substantially lowering the cost of the apparatus and simplifying its construction.

In the apparatus of the invention, the control rod is made longer than the active region of the reactor core by a given amount and protrudes beyond such active region by the given amount. By doing so, it is possible to obtain a short effective removal time for the control rod while using a relatively small pneumatic cylinder providing a correspondingly small acceleration force for the mechanism. This is because the control rod can be accelerated through a distance of travel equal to the given amount prior to any of the control rod being effectively removed from the active region. That is, although the control rod has actually been moved a distance equal to or less than the given amount, the rod still extends completely through the active region of the core and thus its effect on the core is substantially unchanged. Once the control rod begins effectively leaving the active region, it will have attained a sufficient velocity that the effective removal time is quite short—much shorter than if the control rod had to be accelerated from zero velocity as it began its effective removal using the same accelerating force. Since the effective removal time of the control rod does not debut in addition, depends upon the distance which the control rod protrudes from the active region, the force required of the actuating device for a given effective removal time is relatively lower.

Referring now more particularly to the drawing, a suitable drive mechanism is employed to rapidly move the control rod 11, in a nuclear reactor, from a first position within the active region of the reactor core 12 to a second position removed therefrom. The active region of the reactor core is constructed of fuel having a prompt negative temperature coefficient such that the rapid removal of the control rod therefrom will cause the reactor to pulse. In the "Triga" reactors, the high prompt negative temperature coefficient of reactivity is obtained by employing fuel elements which comprise a solid homogeneous mixture of enriched uranium and zirconium hydride. The core is located in a tank (not shown) which is filled with a suitable liquid, such as water, which liquid serves as a radiation shield and reflector.

The core 12 of the illustrated reactor is in the general form of a right cylinder and includes a lattice of generally vertically extending fuel elements 13 held in spaced relationship by upper and lower grid plates 14 and 15, respectively. Each of the fuel elements 13 includes an outer elongated tube 16. The ends of the tube are provided with top and bottom end fixtures 17 and 18, respectively, which are welded tightly to the tube 16. The top end fixtures 17 are designed so as to be engageable by a co-acting lifting means (not shown) for vertically removing the fuel elements from the reactor core. Centrally disposed within each of the tubes 16 is a solid fuel body 19 which may be composed of a homogeneous mixture of uranium 235, zirconium hydride and uranium 238. The upper and lower portions of the tube 16 of each fuel element 13 preferably contain suitable reflecting and moderating material 21, such as graphite.

The fuel elements 13 extend in a generally vertical direction and are generally uniformly spaced on concentric circles. The illustrated reactor core provides positions for 86 fuel elements and any unused positions may be occupied by dummy elements which are generally similar in outer construction to the fuel elements. The dummy elements may be filled with a suitable reflecting material, such as graphite. It should be understood that the number of fuel elements as compared to dummy elements will vary considerably, depending upon the general design and dimensions of the reactor and the particular construction and arrangements of the fuel elements.

The grid plates 14 and 15, which support the fuel elements 13 as heretofore indicated, are held in spaced apart relationship by a tubular shroud 22 which surrounds the fuel elements, the grid plates 14 and 15 being suitably attached thereto. The distance between the grid plates is such that the bottom end fixture 18 of each fuel element rests, respectively, in one of a plurality of recesses 23 in the lower grid plate 15 and the upper grid plate 14 is disposed just above the upper ends of the fuel element tubes 16.

The upper grid plate 14 is provided with a plurality of holes 24 extending therethrough which slidably accommodate the tubular body of the fuel elements 13. All of the weight of the fuel elements 13 is supported by the lower grid plate 15 with the upper grid plate 14 only acting to position the upper portions of the fuel elements 13. A spacer 25 which encircles and is secured to the lower end of the top end fixture 17 of each fuel element provides a passage for the flow of liquid through the upper grid plate 14 while at the same time preventing the upper end of the fuel element from wobbling. The spacer 25 has a transverse cross section of an equilateral triangle with rounded corners.

A plurality of apertures 26 are provided in the shroud immediately above the lower grid plate to permit water to flow by natural convection into the core during operation of the reactor. The convectional flow of the water serves as a coolant for the core of the reactor.

Control rod assemblies are provided in the core for starting up the reactor, operating it at some desired position, pulsing the reactor (i.e., raising the power of the reactor to a very high level for a short period of time), stepping the reactor (i.e., raising the power level to some arbitrary level for a given interval of time), and shutting the reactor down when desired. In general, a control rod assembly includes a rod of material having a large capture cross section for thermal neutrons, such as cadmium, boron or boron carbide. Normally, a control rod is rated according to the reduction of reactivity that occurs when it is fully inserted into the reactor core.

In the illustrated embodiment, four control rod assemblies, 27, 28, 29 and 31 are provided, three of which, 27, 28, and 29 are symmetrically located in the core. The fourth control rod assembly 31 is located in the center of the core 12. The three control rod assemblies 27, 28, and 29 may be driven by separate conventional control rod drive mechanisms (not shown) supported above the reactor tank. The control rod drive mechanisms are controlled so that one of the control rod assemblies 27, 28, and 29 serves as a regulating rod and the other two serve as safety rods, whereby both accuracy and range of control is achieved.

In the illustrated embodiment, the three control rod assemblies 27, 28, and 29 are similar in construction, and each includes a control rod which slides vertically within a respective guide tube 32. The guide tube 32 may be supported in the reactor core 12 by the grid plates 14 and 15. The particular construction of the three control rod assemblies 27, 28, and 29 is not an important feature of this invention and, hence, is not described herein in detail.

The fourth control rod assembly 31 includes a vertically extending guide tube 33 disposed within the core of the reactor. The guide tube 33 is connected to and supported by the grid plates 14 and 15. The guide tube 33, which may be formed of a suitable material having a low neutron cross section, such as aluminum, serves to guide the movement of the vertically extending cylindrical control rod 11 therein and extends a sufficient distance above the reactor core to permit the control rod 11 to be lifted to a position wherein it is removed from the reactor core, or at least from the active region of the reactor core (i.e., the region between the ends of the solid bodies 19 of the fuel elements). In the appended claims, the term reactor core is intended to refer to this active region and not necessarily to the entire core including reflecting and moderating material.

As shown in the drawings, the control rod 11 is slidably disposed in the guide tube 33 for vertical movement relative thereto. For purposes which will be hereinafter described, a connecting plug 35 is provided on the upper end of the control rod. The control rod 11 includes a neutron absorbing material such as cadmium, boron or boron carbide clad in a tube of low atomic weight non-corrodable metal, such as aluminum.

The control rod 11 is moved by means of a lower connecting rod portion 34 which is attached to the plug 35 on the top of the control rod. The lower connecting rod portion may be comprised of metal tubing. An insert 36 is secured to the lower end of the lower connecting rod portion 34 by means of staked dowel pins 37. The insert 36 has a recess at its lower end portion which threadedly mates with the plug 35 on the top of the control rod 11 and is further secured thereon by staked dowel pins 38.

An upper connecting rod portion 39, of tubular metal construction, is also provided. The upper rod portion 39 is connected to the lower connecting rod portion 34 in a manner which will be subsequently described and is axially aligned therewith. The upper end of the upper connecting rod portion has an insert 41 secured therein by means of a plurality of staked dowel pins 42. The insert 41 is threadedly connected to the lower end of the piston rod 43 of a pneumatic cylinder actuating device 44. A set screw 40 is also provided to discourage loosening of the threads. The pneumatic cylinder device 44 is secured to a support bridge 45 which extends over the top of the reactor tank and is in fixed relation to the reactor core 12. Actuation of the hydraulic cylinder device 44 will cause rapid axial movement of the piston rod 43 and, consequently, will cause axial movement of the upper and lower connecting rod portions 39 and 33, and the control rod 11. The piston rod 43 is movable from a first position wherein the control rod 11 is fully inserted in the active region of the reactor core 12 to a position wherein the control rod 11 is fully removed therefrom.

Figure 4:
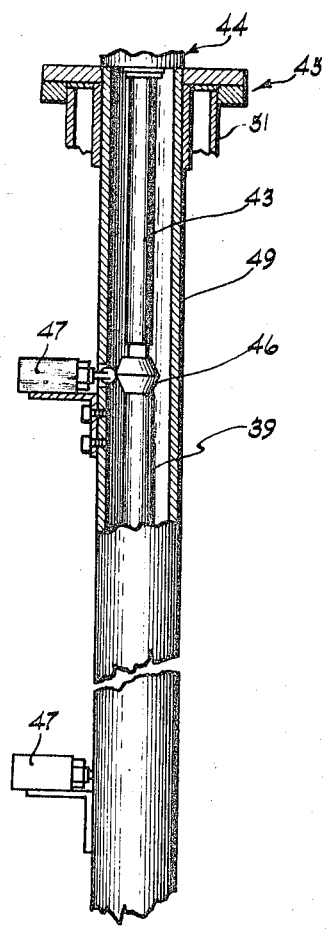
FIGURE 4 is an elevational view of a portion of the drive mechanism rotated 90° from the position shown in FIGURE 3.

In the illustrated embodiment, provision is made for electrically indicating the vertical movement of the pneumatic cylinder device 44 to prevent damage to the mechanism by excessive movement of the device 44. To this end, the insert 41 at the top end of the upper control rod portion 39 is provided with an annular shoulder 46 projecting outwardly therefrom. This shoulder engages one of two limit switches 47 (see FIGURE 4) at the extreme ends of the travel of the mechanism. These switches 47 are connected into conventional limit switch circuits (not shown) which operate to open or close a suitable valve in the pneumatic supply (not shown) for the pneumatic cylinder device 44 and relieve the pneumatic force operating on the piston of the pneumatic cylinder device at the limits of the desired travel. A control rod drive mechanism utilizing limit switches in a similar manner is shown and described in U.S. Patent No. 3,162,579, assigned to the assignee of the present invention.

In the illustrated embodiment, the control rod 11 is made approximately twice as long as the axial dimension of the active region of the core (i.e., the length of sections 19). The length of the control rod depends upon the amount of accelerating travel desired before effective removal begins, and therefore need not necessarily be twice the length of the active region of the core. The top of the control rod, in the first position, is flush with the top of the active region of the core as in FIGURE 1. Thus, the bottom of the control rod 11 will project beyond the lower edge of the active region of the core a distance equal to the difference in axial dimension between the control rod and the active region of the core. When the pneumatic cylinder device 44 is actuated to withdraw the control rod from the core and pulse the reactor, the extra length of the control rod 11 permits the mechanism to accelerate the control rod before the core region is materially affected, thus providing a very rapid effective withdrawal of the rod. For example, a withdrawal time of the order of 50 milliseconds is possible for a 30 inch control rod and 15 inch long active region of the core. For a given withdrawal time, the force required of the pneumatic cylinder is substantially less when the construction of the invention is used than would be required if the control rod began its effective withdrawal at zero velocity. This is because in the apparatus of the invention, the time needed for acceleration need not be used for effective withdrawal. As a result of the lower force requirement, a correspondingly smaller pneumatic cylinder may be used.

Obviously, such fact acceleration and high speed withdrawal imparts considerable kinetic energy to the mechanism and linkages therein. Space limitations may require that the mechanism be stopped within a relatively short time and distance after the control rod is removed from the active region of the core. This means that the considerable kinetic energy of the system must be absorbed very quickly. In order to accomplish this, an energy absorbing device 48 couples the upper and lower connecting rod portions 39 and 34. The energy absorbing device, in the construction shown in the drawings, comprises a dash pot 48. The dash pot 48 is secured in a fixed position with respect to the bridge 45 and hence the reactor core 12 by means of a downwardly extending sleeve 49 which surrounds the upper connecting rod portion 39 and is coaxial therewith. The sleeve 49 is secured to a flange 50 of mounting bracket 51 by a plurality of staked dowel pins 52 and the mounting bracket, in turn, is secured to the bridge 45 and to transverse channels 53 extending along beneath the bridge by suitable means such as welding.

The dash pot 48 includes a housing 54 defining a damping cylinder. The housing 54 is suitably mounted to the lower extremity of the sleeve 49 and a plurality of fluid conducting openings 55 are provided through the housing 54 and sleeve 49. The housing 54 is shaped to fit inside the lower end of the sleeve 49 and has an annular shoulder 56 thereon which abuts the end of the sleeve to position the housing precisely. The upper end of a vertically extending rod 57 is threaded into the lower end of insert 41 and is held therein by a set screw 60. The lower end of the rod 57 is threadedly secured in an insert 59 in the upper end of the lower connecting rod portion 34. The insert 59 is secured to the lower connecting rod portion by a plurality of staked dowel pins 61. Thus, the combination of upper and lower connecting rod portions and the rod 57 comprise sections of rigid connecting rod coupled from the hydraulic cylinder device to the control rod. The rod 57 passes through a seal 62 located within an opening in the top end of housing 54.

A piston 63, which may be comprised of polyethylene, is secured by means such as threading to the upper end of the insert 59 which, as mentioned before, is fixed to the upper end of the lower connecting rod portion 34 and to the rod 57. The piston 63 is shaped to mate in the dash pot cylinder and travels therein a given distance.

On its upward stroke, the piston 63 is damped by the fluid action of water which it forces through openings 55 into the reactor tank. The upper end of the guide tube 33 for the control rod 11 extends into the dash pot housing 54 and is centered therein by means of a centering sleeve 64 secured by a set screw 65 to the lower end of the interior of the dash pot housing.

Figure 3:
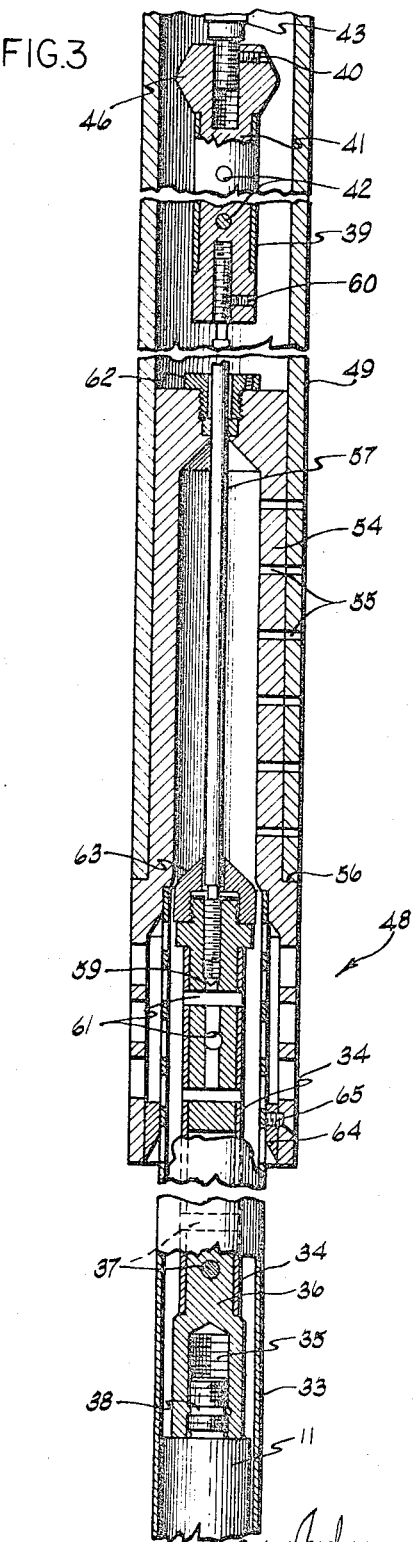
FIGURE 3 is an enlarged full section view of a portion of the drive mechanism of the invention broken away in FIGURE 1 and in a position wherein the control rod is raised from its position in FIGURE 1.

In FIGURE 3, the mechanism is shown with the piston 63 just entering the dash pot cylinder. This would be a position just subsequent to complete withdrawal of the control rod 11 from the active region of the reactor core 12 and would represent the beginning of the damping movement for the mechanism. Once the piston 63 has traveled to the upper end of the dash pot cylinder, all the kinetic energy of the system will be absorbed by the dash pot and the mechanism will be at rest. Subsequently, the pneumatic cylinder 44 may be deactivated, permitting gravitational force to drive the control rod 11 back down into its initial position in the reactor core 12. The guide tube 33 may allow, for example, a 30-inch long control rod 11 to travel 36 inches. The remaining 6 inches of the 36-inch stroke after withdrawal of the control rod 11 from the reactor would be utilized by the dash pot 48 for deceleration of the mechanism.

In accordance with the invention, the piston 63 and dash pot cylinder housing 54 are located relatively close to the reactor core 12. By positioning the dash pot 48 near the reactor core 12, the greater portion of the control rod linkages, namely, the pneumatic cylinder device 44, the upper connecting rod portion 39, and the rod 57, are all subjected to tensile forces, as opposed to compressive or column loading forces, during deceleration. The yield strength of metals generally being far greater under tensile loading as opposed to column loading, this construction permits the use of relatively lightweight linkages. This minimizes the moving weight of the mechanism, thereby reducing the accelerating force required of the pneumatic cylinder and the kinetic energy which it is necessary for the dash pot to absorb. It will be appreciated that the required strength in the elements of the mechanism is further reduced by the fact that there is less energy to absorb. The longer the stroke of the dash pot piston 63 the less the average force necessary to dissipate the kinetic energy during deceleration. The stroke should therefore be maximized consistent with other requirements as to space, time and materials.

Thus, in the improved drive mechanism, the kinetic energy which must be absorbed at the end of travel of the mechanism is minimized while obtaining a rapid withdrawal of the control rod 11 by means of a relatively simple and low cost apparatus. The use of relatively lightweight linkages and a relatively small pneumatic cylinder actuating device is possible within the requirements of the mechanism. Various modifications and embodiments of the invention other than that shown in the drawings will be apparent to those skilled in art from the foregoing description. Such other modifications and embodiments are intended to fall within the scope of the appendant claims.

What is claimed is:

1. A rod assembly including an elongated rod having a portion made of neutron-absorbing material which is longer than the corresponding dimension of the active region of the core of the reactor wherein said rod is disposed, said reactor dimension being taken parallel to said elongated rod, and drive mechanism therefor for rapidly axially moving said rod in said nuclear reactor from a first position wherein part of said neutron-absorbing portion of said rod is within the active region of the reactor core to a second position wherein all of said neutron-absorbing portion of said rod is external of the active region of the reactor core, said rod when in said first position extending throughout the entirety of said dimension of said active region of said core and protruding a given distance exterior of said active region on the opposite side of said active region from the side of said second position, said given distance being at least about equal to said dimension of the active region, said drive mechanism including actuating means coupled to connecting rod means adjacent one end of said rod for moving same from said first position axially to said second position, said actuating means being constructed to accelerate said rod to a desired velocity while moving a distance equal to said given distance to thereby significantly reduce the time increment of effective removal of said neutron-absorbing material from said active region and thus correspondingly significantly decrease the time increment of insertion of reactivity which causes said reactor to pulse, and said drive mechanism also including energy absorbing means associated with said connecting rod means to absorb the energy of said control rod as said control rod reaches said second position.

2. A rod assembly in accordance with claim 1 wherein said energy absorbing means is connected to said connecting rod means at a location proximate the end of said rod toward which there is travel during movement to said second position.

3. A rod assembly in accordance with claim 1 for a reactor whose core is disposed in a tank of water, wherein said shock-absorber means includes a piston connected to said connecting rod means and a dash pot, which dash pot has a housing within which said piston interfits, said housing having apertures in the wall thereof to permit entry and exit of water from said tank.

References Cited

UNITED STATES PATENTS

| | | | |
|---|---|---|---|
| 2,855,899 | 10/1958 | Beaty | 176—36 |
| 3,106,519 | 10/1963 | Schwan et al. | 176—36 |
| 3,107,209 | 10/1963 | Frisch | 176—36 |
| 3,151,034 | 9/1964 | Douglass et al. | 176—86 |
| 3,152,960 | 10/1964 | Alfred | 176—36 |
| 3,162,579 | 12/1964 | Thomas et al. | 176—36 |
| 3,230,147 | 1/1966 | Hitchcock | 176—35 |
| 3,267,002 | 8/1966 | Fromm et al. | 176—86 |

OTHER REFERENCES

AEC document, IDO–16790, 1962, pp. A–12, A–22, A–24, A–26, A–27, A–28, A–35, A–37, A–39, A–30, A–40, A–42.

AEC document, ANL–6034, 1960, pp. 14, 17, 20, 21, 39–41, 44–48, 51.

BENJAMIN R. PADGETT, *Primary Examiner.*

H. E. BEHREND, *Assistant Examiner.*

U.S. Cl. X.R.

176—86